United States Patent [19]

Wakabayashi et al.

[11] Patent Number: 5,710,951
[45] Date of Patent: Jan. 20, 1998

[54] PHOTOGRAPH INFORMATION RECORDING APPARATUS CAPABLE OF RECORDING REPRODUCTION CONTROL INFORMATION AND REPRODUCING APPARATUS FOR REPRODUCING PHOTOGRAPH INFORMATION ON THE BASIS OF SAID REPRODUCTION CONTROL INFORMATION

[75] Inventors: Hiroshi Wakabayashi, Yokohama; Hiroshi Terunuma, Ichikawa, both of Japan

[73] Assignee: Nikon Corporation, Tokyo, Japan

[21] Appl. No.: 783,998

[22] Filed: Jan. 15, 1997

Related U.S. Application Data

[63] Continuation of Ser. No. 658,013, Jun. 4, 1996, abandoned, which is a continuation of Ser. No. 533,671, Sep. 26, 1995, abandoned, which is a continuation of Ser. No. 412,596, Mar. 29, 1995, abandoned, which is a continuation of Ser. No. 255,890, Jun. 7, 1994, abandoned, which is a continuation of Ser. No. 86,363, Jul. 6, 1993, abandoned, which is a continuation of Ser. No. 957,064, Oct. 6, 1992, abandoned, which is a continuation of Ser. No. 841,297, Feb. 28, 1992, abandoned, which is a continuation of Ser. No. 693,069, May 1, 1991, abandoned, which is a continuation of Ser. No. 372,558, Jun. 28, 1989, abandoned.

[30] Foreign Application Priority Data

Jul. 4, 1988 [JP] Japan .................. 63-88624 U

[51] Int. Cl.$^6$ .................... G03B 17/24
[52] U.S. Cl. .................... 396/311
[58] Field of Search .................... 396/311

[56] References Cited

U.S. PATENT DOCUMENTS

| | | | |
|---|---|---|---|
| 4,652,104 | 3/1987 | Harvey | 354/106 |
| 4,728,978 | 3/1988 | Inoue et al. | 354/106 X |
| 4,780,735 | 10/1988 | Taniguchi et al. | 354/106 X |

*Primary Examiner*—David M. Gray
*Attorney, Agent, or Firm*—Shapiro and Shapiro

[57] ABSTRACT

In a system comprising photographing apparatus for recording photograph information and reproducing apparatus for reproducing the photograph information, control information recorded in the photographing apparatus forces the reproducing apparatus to reproduce photograph information that would otherwise be excluded from reproduction based on consideration of a characteristic of the photograph information.

23 Claims, 3 Drawing Sheets

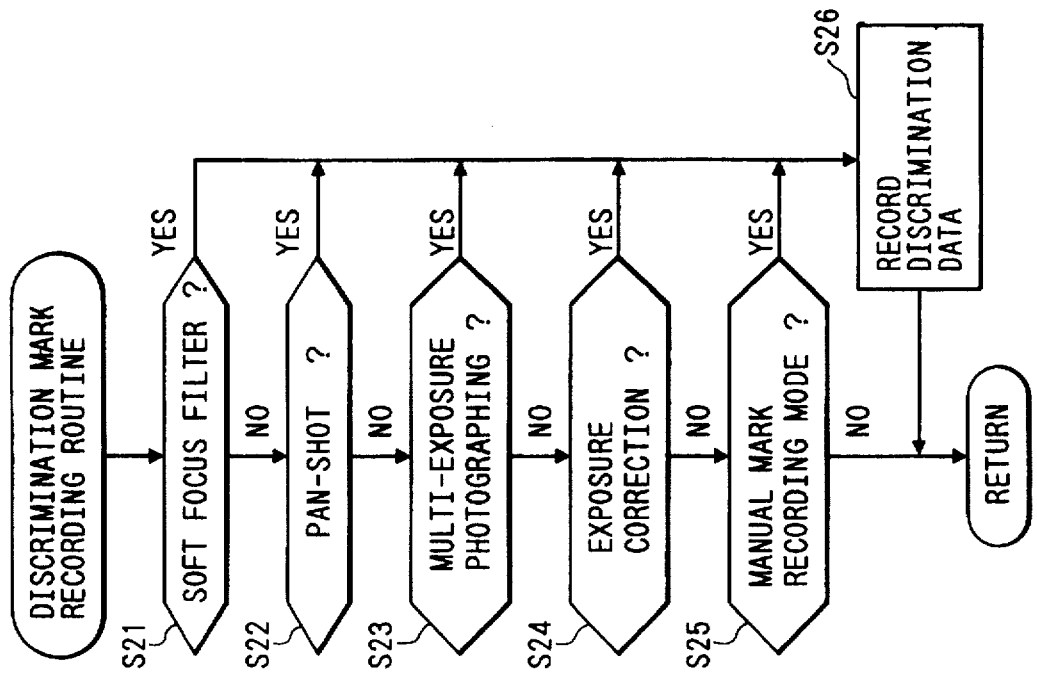
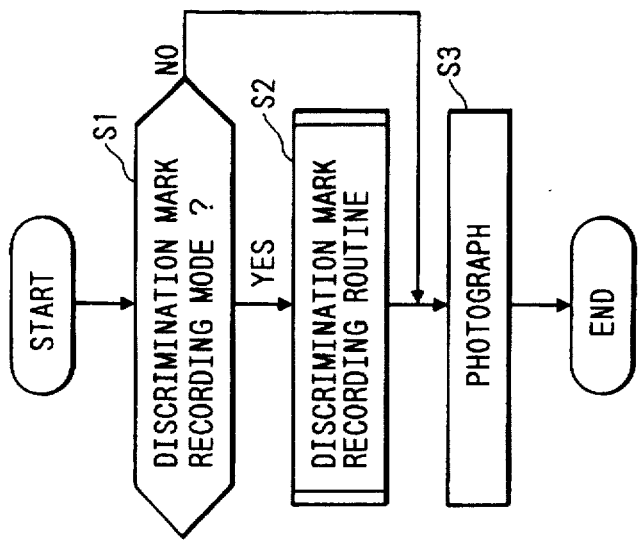

PHOTOGRAPH INFORMATION RECORDING APPARATUS CAPABLE OF RECORDING REPRODUCTION CONTROL INFORMATION AND REPRODUCING APPARATUS FOR REPRODUCING PHOTOGRAPH INFORMATION ON THE BASIS OF SAID REPRODUCTION CONTROL INFORMATION

This is a continuation of application Ser. No. 08/658,013 filed Jun. 4, 1996, which is a continuation of application Ser. No. 08/533,671 filed Sep. 26, 1995, which is a continuation of application Ser. No. 08/412,596 filed Mar. 29, 1995, which is a continuation of application Ser. No. 08/255,890 filed Jun. 7, 1994, which is a continuation of application Ser. No. 08/086,363 filed Jul. 6, 1993, which is a continuation of application Ser. No. 07/957,064 filed Oct. 6, 1992, which is a continuation of application Ser. No. 07/841,297 filed Feb. 28, 1992, which is a continuation of application Ser. No. 07/693,069 filed May 1, 1991, which is a continuation of application Ser. No. 07/372,558 filed Jun. 28, 1989, all now abandoned.

BACKGROUND OF THE INVENTION

1. Field of the Invention

This invention relates to a camera capable of recording discrimination information indicative of "printing without fail", for example, on the blank space of a film, and a photograph information outputting device for printing, for example, a frame on which said discrimination information has been detected, without fail.

2. Related Background Art

Films subjected to multi-exposure photographing or photographing using a soft focus filter may be regarded as double exposure or out-of-focus photographs and fail to be printed in a processing laboratory. A similar problem may arise in the case of pan-shot or intentionally blurred photographs, photographs such as the photographs of heavenly bodies having necessary images only in limited parts of the pictures, said images being liable to be overlooked, and scientific photographs difficult to understand to laymen. In a pan-shot a photograph of a moving object is taken by pursuing it and catching it in a frame.

SUMMARY OF THE INVENTION

It is an object of the present invention to provide a photograph information recording apparatus capable of recording, for example, reproduction control information indicative of "printing without fail" and a reproducing apparatus designed to control the reproduction of photograph information on the basis of said reproduction control information.

It is another object of the present invention to provide a visualization reproduction system comprising a photograph information recording apparatus for recording reproduction control information and a reproducing apparatus for effecting the reproduction of photograph information on the basis of said reproduction control information.

BRIEF DESCRIPTION OF THE DRAWINGS

FIGS. 1 to 5 show an embodiment of the present invention,

FIGS. 2 and 3 being flow charts showing the processing procedure of the camera side, FIG. 4 being a flow chart showing the processing procedure of the printer side, and FIG. 5 showing a developed film.

DESCRIPTION OF THE PREFERRED EMBODIMENT

An embodiment in which the present invention is applied to a camera using a silver salt film and the printer thereof will hereinafter be described with reference to FIGS. 1 to 5.

Figure 1A:
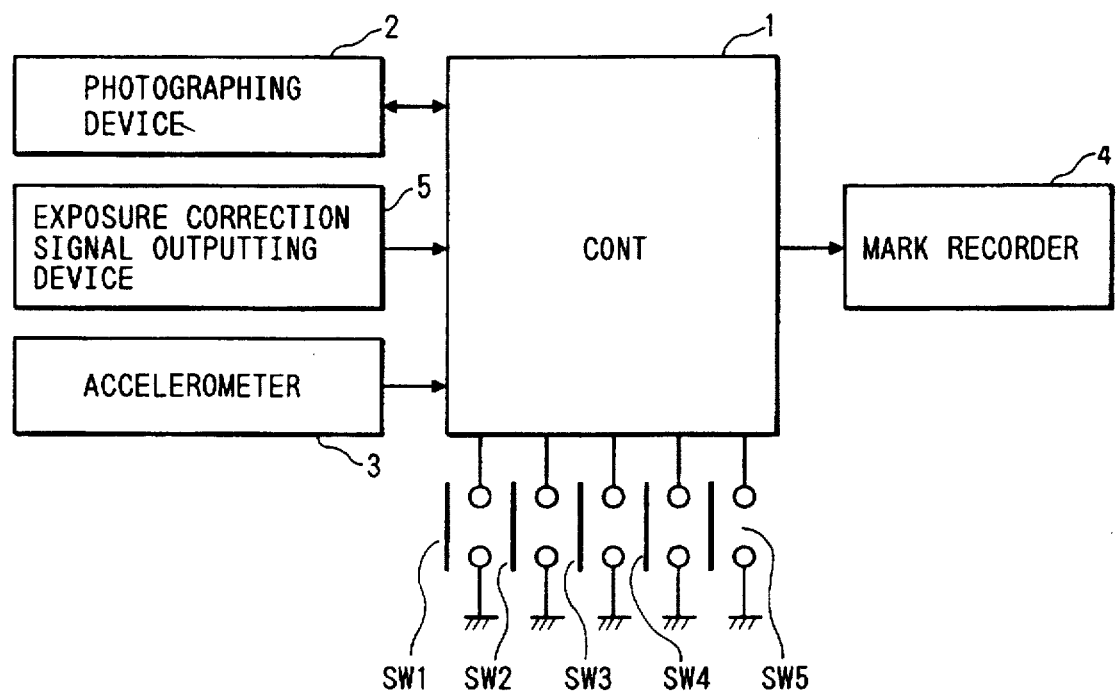
FIG. 1A showing the general construction of a camera.

Referring to FIG. 1A which shows the general construction of the camera, the photographing device 2 of the camera, an accelerometer 3, a mark recorder 4, an exposure correction signal outputting device 5 and various switches SW1-SW5 are connected to a control circuit 1 including a CPu or the like.

Figure 5:
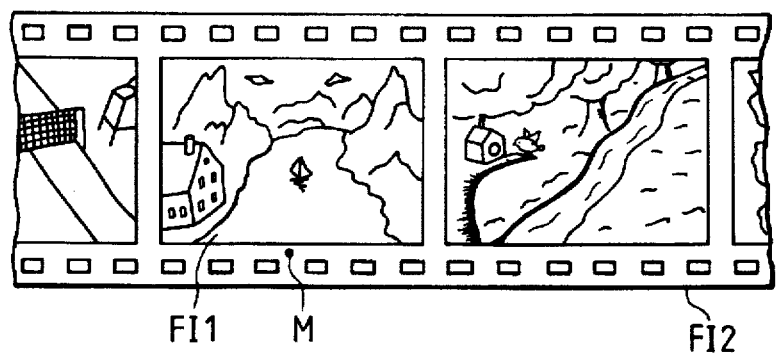

The photographing device 2 includes a diaphragm, a shutter, an auto focusing device, a winding-up device, etc. The accelerometer 3 detects the acceleration of the camera during exposure of the film to automatically detect a pan-shot. The mark recorder 4 is for imprinting a discrimination mark M as discrimination data in the blank space of a film, as shown in FIG. 5, and includes a light source. The discrimination mark M is a mark indicative of "printing without fail" during printing, irrespective of the state of the image in the picture plane of the film. Although in FIG. 5, the discrimination mark is shown as ".", it may be a digital code or a bar code. The exposure correction signal outputting device 5 outputs a signal for correcting the exposure value, for example, by ±1–±5 steps.

The switch SW1 is a photographing start switch adapted to be closed in response to the release operation, the switch SW2 is a soft focus filter use detecting switch adapted to be closed when a soft focus filter is used, the switch SW3 is a switch adapted to be closed when the multi-exposure mode is selected, the switch SW4 is an automatic recording mode switch adapted to be closed when the automatic discrimination mark recording mode is selected, and the switch SW5 is a manual recording mode switch adapted to be closed when the manual discrimination mark recording mode is selected. If the automatic discrimination mark recording mode is selected, the discrimination mark M is automatically imprinted when the use of a soft focus filter, multi-exposure or pan-shot is detected, and if the manual discrimination mark recording mode is selected, the discrimination mark M is imprinted without fail during photographing. These two modes are generically called the discrimination mark recording mode.

The procedure of imprinting the discrimination mark will now be described with reference to FIGS. 2 and 3.

When the photographing start switch SW1 is closed, the process of FIG. 2 is carried out and first, at step S1, whether the mode is the discrimination mark recording mode is judged. If the automatic recording mode switch SW4 or the manual recording mode switch SW5 is in its ON state, this step S1 is affirmed and advance is made to the subroutine of step S2. When the step S1 is negated, advance is made to step S3.

Here, the discrimination mark recording routine of FIG. 3 will be described.

At step S21, whether a soft focus filter is being used is judged from the signal of the switch SW2. At step S22, the presence of a pan-shot is judged on the basis of the signal from the accelerometer 3. At step S23, whether multi-exposure photographing is being effected is judged from the signal of the switch SW3. At step S24, whether an exposure correction signal is being output is judged. At step S25, whether the mode is the manual discrimination mark recording mode is judged. If one of these steps S21–S25 is affirmed, advance is made to step S26, where the discrimination mark M is imprinted in the blank space of the film by the mark recorder 4, and return is made to the original process. If all of the steps S21–S25 are negated, return is made to the original process without the discrimination mark M being imprinted.

When return is made from the above-described subroutine to the main routine of FIG. 2, step S3 is executed and photographing is effected by the photographing device 2 through a well-known procedure and as a result, during soft focus photographing or multi-exposure photographing, the discrimination mark M is imprinted in the blank space of the film as shown in FIG. 5. In FIG. 5, F11 and F12 designate the photograph information memorizing areas of respective frames.

Accordingly, the presence or absence of this discrimination mark M is visually discriminated when developing the film, and if the discrimination mark M is present, it becomes possible to force the film to be printed without fail irrespective of the condition of the photographed image. Also when printing is to be automatically effected, the presence of the discrimination mark M could force the film to be forcibly printed irrespective of the condition of the photographed image. A printer of this type will hereinafter be described with reference to FIGS. 1B and 4.

Figure 1B:
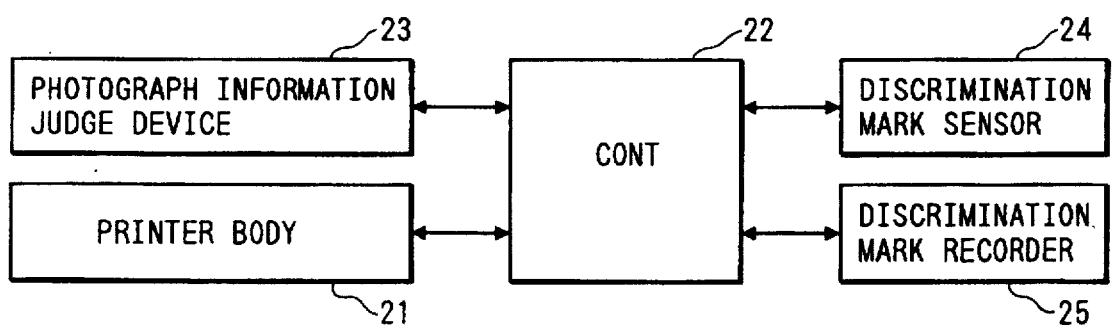
FIG. 1B showing the general construction of a printer.

Referring to FIG. 1B which schematically shows the construction of this printer, a control circuit 22 including a CPU or the like is connected to a well-known printer body 21, and a photograph information judge device 23, a discrimination mark sensor 24 and a discrimination mark recorder 25 are connected to the control circuit 22.

The printer body 21 has a light source, a film feeding device, a lens and a photographic paper feeding device, and prints the photograph information regarding an object on the film on photographic paper by the light of the light source. The film and the photographic paper are automatically fed. The photograph information judge device 23 judges the propriety of the photograph information on the film on the basis of the condition of said photograph information, for example, whether the exposure value is too under or too over. The discrimination mark sensor 24 detects the presence or absence of the above-described discrimination mark M. The discrimination mark recorder 25 records, for example, a mark "." at an end of photographic paper on which is printed a film from which the presence of the discrimination mark has been detected. That is, a photograph having the mark "." on the photographic paper is a multi-exposure or pan-shot photograph and therefore, it is prevented from being excluded as an inadequate photograph.

Figure 4:
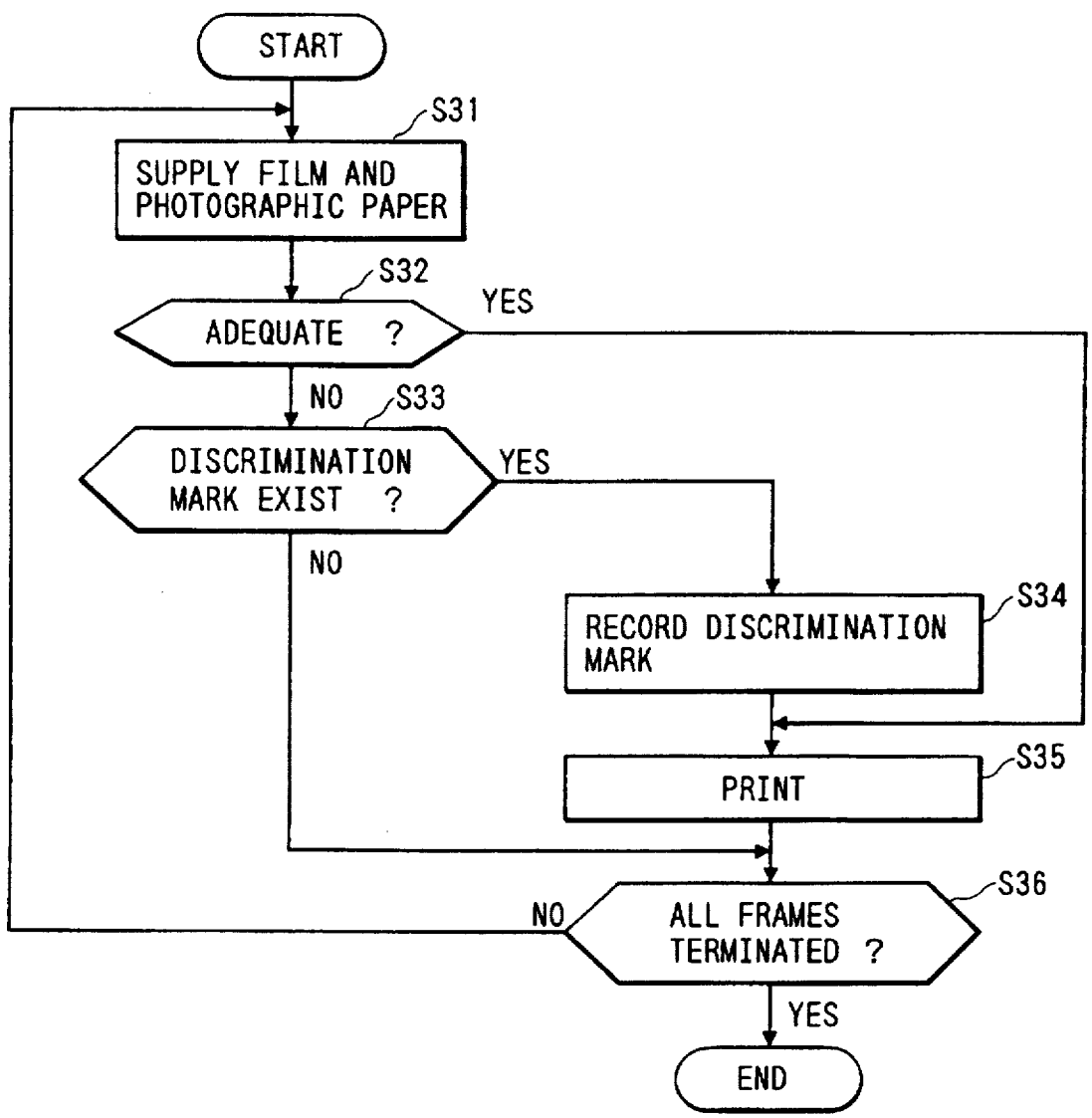

The processing procedure during printing shown in FIG. 4 will now be described.

First, at step S31, a film to be printed and new photographic paper are supplied to an adequate location. At this location, whether the photograph information regarding the object recorded on the film is adequate is judged by the photograph information judge device 23 (step S32). Also, the presence or absence of the discrimination mark M in the blank space of the film is detected by the discrimination mark sensor 24 (step S33). If a film photographed with multi-exposure or exposure correction or a film such as the photograph of heavenly bodies is judged as inadequate by the photograph information judge device 23, advance is made to step S33. If at step S33, the absence of the discrimination mark is detected by the discrimination mark sensor 24, advance is made to step S36 without printing being effected. If at step S33, the presence of the discrimination mark is detected by the discrimination mark sensor 24, the discrimination mark recorder 25 is driven at step S34 and a discrimination mark "." indicative of "being a special photograph" is recorded in a corner of the photographic paper, whereafter at step S35, the photograph information on the film is printed on the photographic paper. When at step S32, the film is judged as adequate, advance is immediately made to this step S35, where printing is effected. At step S36, whether printing of all frames has been terminated is judged, and if the answer is affirmative, advance is made to the end, and if the answer is negative, the above-described steps S31–S35 are repeated until this step S36 is negated.

In the foregoing, the discrimination mark M has been described as being recorded in the blank space of the film, but alternatively, a memory portion may be provided on a film magazine and instead of the discrimination mark M, the discrimination data of a digital code may be memorized in the memory portion, or the discrimination data may be memorized on a memory medium such as a memory card discrete from a film. In such cases, during printing or the like, it is necessary to read various kinds of information with the film and the magazine or the memory card being made to correspond to each other.

Also, in the foregoing, a description has been given of an ordinary still camera using a silver salt film and an apparatus for printing the developed film thereof, but the present invention is not restricted thereto. It can also be applied, for example, to an electronic camera in which photograph information obtained by photographing is memorized on a floppy disc and a printer outputs the memorized photograph information as a hard copy or a display device which visualizes the memorized photograph information on the screen of a CRT. In this case, the photograph information of each frame and discrimination data are magnetically recorded correspondingly to each other on the floppy disc as a photograph information memory medium and a discrimination data memory medium, and the propriety of the photograph information is judged on the printer side or the display side and the presence or absence of the discrimination data is judged.

According to the present invention, for example, discrimination data indicative of "printing without fail" is recorded in the blank space of a film in conformity with a certain condition and therefore, it can be discriminated that the film is a film intentionally double exposed or under-exposed. As a result, there is no possibility that the film is excluded by mistake when the photograph information is visualized as by printing the film on photographic paper. Furthermore, in an apparatus such as a printer which outputs photograph information as a visualized image, when the above-described discrimination data has been detected, even the photograph information on the memory medium which is inadequate and will generally be excluded from visualization is visualized without fail.

We claim:

1. A photographic system comprising photographing means for recording photograph information, control means for recording reproduction control information in association with said photograph information, and reproducing means for reproducing photograph information, said reproducing means including means for determining whether or not to reproduce photograph information depending upon a characteristic thereof, and means for forcing reproduction of photograph information, regardless of the characteristic thereof, in response to reproduction control information recorded in association with the photograph information.

2. A photographic system according to claim 1, wherein said control means records reproduction control information in response to an input thereto designating soft focus filter photography.

3. A photographic system according to claim 1, wherein said control means records reproduction control information in response to an input thereto designating multi-exposure photography.

4. A photographic system according to claim 1, wherein said control means records reproduction control information in response to an input thereto designating pan-shot photography.

5. A photographic system according to claim 1, wherein said control means records reproduction control information in response to an input thereto designating special photographing conditions.

6. A photographic system according to claim 1, wherein said control means records reproduction control information in response to an input thereto designating a decision by a photographer to record reproduction control information.

7. A photographic system according to claim 1, wherein said control means is responsive to acceleration of said photographing means to record said reproduction control information.

8. Photographic apparatus having photographing means for recording photograph information and control means for recording reproduction control information in association with the photograph information, and comprising an accelerometer, said control means recording reproduction control information in response to acceleration of said photographic apparatus determined by said accelerometer.

9. Photographic apparatus according to claim 8, further comprising means for causing said control means to record reproduction control information in response to an input thereto designating special photographing conditions.

10. Photographic apparatus comprising means for reproducing photograph information, means responsive to a characteristic of photograph information for determining whether or not said reproducing means reproduces that photograph information, means for detecting reproduction control information associated with photograph information, and means responsive to said detecting means for forcing said reproducing means to reproduce photograph information regardless of the characteristic of that photograph information.

11. Photographic apparatus according to claim 10, further comprising means for applying a distinctive mark to a forced reproduction of photograph information.

12. A photographic method comprising recording a plurality of units of photograph information, recording reproduction control information in association with units of photograph information selectively, determining whether or not to reproduce units of photograph information depending upon a characteristic thereof, and forcing reproduction of units of photograph information, regardless of the characteristic thereof, in response to reproduction control information recorded in association with the last-mentioned photograph information.

13. A photographic system comprising a photographing device which records photograph information on a medium, a control circuit connected to said photographic device, which records reproduction control information on the medium in association with said photograph information, and a reproducing device which reproduces photograph information recorded on the medium, said reproducing device including a determining device which determines whether or not to reproduce photograph information recorded on the medium depending upon a characteristic thereof, and a control unit connected to said determining device, which forces reproduction of photograph information, regardless of the characteristic thereof, in response to reproduction control information recorded in association with the photograph information.

14. A photographic system according to claim 13, wherein said control circuit is connected to a soft focus filter use detecting switch and records reproduction control information in response to an input thereto from said soft focus filter use detecting switch designating soft focus filter photography.

15. A photographic system according to claim 13, wherein said control circuit is connected to a multi-exposure mode detecting switch and records reproduction control information in response to an input thereto from said multi-exposure mode detecting switch designating multi-exposure photography.

16. A photographic system according to claim 13, wherein said control circuit is connected to a pan-shot detecting device and records reproduction control information in response to an input thereto from said pan-shot detecting device designating pan-shot photography.

17. A photographic system according to claim 13, wherein said control circuit is connected to an automatic recording mode switch and records reproduction control information in response to an input thereto from said automatic recording mode switch designating special photographing conditions.

18. A photographic system according to claim 13, wherein said control circuit is connected to a manual recording mode switch and records reproduction control information in response to an input thereto from said manual recording mode switch designating a decision by a photographer to record reproduction control information.

19. A photographic system according to claim 13, wherein said control circuit is connected to an accelerometer and is responsive to acceleration of said photographing device determined by said accelerometer to record said reproduction control information.

20. Photographic apparatus having a photographing device which records photograph information on a medium and a control circuit connected to said photographing device, which records reproduction control information on the medium in association with the photograph information, and comprising an accelerometer connected to said control circuit, said control circuit recording reproduction control information in response to acceleration of said photographic apparatus determined by said accelerometer.

21. Photographic apparatus according to claim 20, wherein said control circuit is connected to an automatic recording mode switch and records reproduction control information in response to an input thereto designating special photographing conditions from said automatic recording mode switch.

22. Photographic apparatus comprising a reproducing unit which is connected to a control unit and which reproduces photographic information recorded on a medium, a determining device connected to said control unit, which determines, in response to a characteristic of photograph information, whether or not said reproducing unit reproduces that photograph information, and a detecting device connected to said control unit, which detects reproduction control information recorded on the medium in association with photograph information, wherein, in response to said detecting device, said control unit forces said reproducing unit to reproduce photograph information regardless of the characteristic of that photograph information.

23. Photographic apparatus according to claim 22, further comprising an applying device which is connected to said control unit and which applies a distinctive mark to a forced reproduction of photograph information.

* * * * *